3,179,521
METHOD OF MAKING SAUSAGE PRODUCTS
Arthur E. Poarch, Mill Valley, Calif., assignor to Western Dairy Products, Inc., San Francisco, Calif., a corporation of California
No Drawing. Filed June 20, 1960, Ser. No. 37,024
2 Claims. (Cl. 99—109)

This invention relates to the preparation of comminuted meat products comprising meat, fat, cereals, water, non-fat dry milk, curing salts and flavors. These comminuted meat products are exemplified in commerce by frankfurters, bologna, salami and certain other loaf meats which may or may not be enclosed in natural or synthetic casing materials.

An object of the invention is to provide a comminuted meat product having improved physical characteristics, including a higher density, firmer texture, and less free fat, compared to those of presently available comminuted meat products.

A further object of the invention is to provide a meat product additive whereby such a meat product having the described improved physical characteristics may be obtained.

A desirable and commercially used constituent of such meat product combinations is dry skim milk. Dry skim milk enhances the flavor and texture of the sausage and helps to prevent the excessive loss of moisture during processing and during the period when it is distributed to the consumer trade.

One of the difficulties encountered in the manufacture of sausage is the separation of the fat constituent from the comminuted mixture during the cooking and processing steps. Free fat may accumulate between the outside of the body of the meat product and the inside of the casing material. This accumulation of free fat is unsightly. Where meat loaf products are produced without the presence of a casing and are processed within the confines of a mold or pan, free fat may accumulate between the inner wall of the mold or pan and the body of the processed meat loaf.

The free fat which may separate from the body of the sausage may not only accumulate under the surface of the casing but may also appear as "fat pockets" within the sausage itself. This accumulation results in the uneven texture of the sausage and is likewise unsightly.

Regular dry skim milk powder as the constituent in sausage tends to prevent the accumulation of fat within the casing-sausage interface or as fat pockets in the body of the product. The degree to which regular dry skim milk powder will prevent fat separation depends, among other factors, upon the overall sausage formulation, the relative solubility of the milk powder and the processing and cooking technique used in the preparation of the sausage. However, compared to certain natural gums, emulsifying agents and special protective colloids, dry skim milk powder has comparatively little ability to prevent the localizing accumulation of free fat.

Protective colloid materials such as the natural gums, sodium alginate and sodium caseinate are used to minimize fat separation by preventing the small fat particles form coalescing. These protective colloids leave much to be desired from the flavor and texture standpoints as a sausage ingredient, particularly when compared to regular dry skim milk powder.

It is known that the lactose contained in dry skim milk powder enhances and complements the flavor of sausage ingredients. The casein and albumen proteins of skim milk powder not only improve the nutritional properties of the sausage but likewise contribute to a better flavored product.

Skim milk powder improves the texture, tenderness, and smooth appearance of sausage containing it when compared to a product that does not contain dry skim milk powder.

From the commercial standpoint, it is obvious that a dry skim milk powder possessing an inherent ability to improve texture and flavor of sausage but having increased protective colloid properties is most desirable.

The present discovery is that skim milk powder treated as hereinafter described has the desired increased ability to prevent fat separation within the meat product during the processing step used in its preparation.

The modified dry skim milk product constituting the meat product additive of the invention is obtained through the use of alkaline compounds, such as potassium or sodium hydroxide, salts of alkali metals and phosphoric acid such as trisodium phosphate, sodium carbonate or sodium bicarbonate.

The process consists of adding the alkali or the alkali metal salt to fluid skim milk or to concentrated skim milk in sufficient quantity to adjust the pH of the final mixture to the range of 6.8–7.3, heating the resulting mixture to the range of 135–160° F., holding the mixture under agitation for a sufficient time to properly treat the mixture, and the spray drying of the mixture to a powder.

For example, the modified dry skim milk product may be prepared through the use of:

| | Lbs. |
|---|---|
| Skim milk solids (as 39% solids concentrate) | 100 |
| Trisodium phosphate (anhydrous) | 1.5 |
| Water (150° F.) | 5.0 |

The concentrated skim milk is added to a steam or water-jacketed tank and heated with stirring to a temperature of 110–120° F. In a separate container, the 1.5 lbs. of trisodium phosphate are dissolved in the 5.0 lbs. of 150° F. water. The resulting solution of trisodium phosphate is added to the warmed concentrated milk in two stages, since the basic acidity of the milk may vary from time to time and from place to place and it is desired that the reaction not be overdone, i.e., to a point where the pH of the treated milk may be above 7.3. Therefore, about 90% of the trisodium phosphate is first added to the milk, and the temperature of the mixture is increased to 145° F. where it is maintained for a period of 10–20 minutes. The pH of the mixture is then checked. If the pH is below 6.8, as much of the 10% remainder of the trisodium phosphate is added as is needed to adjust the pH to 7.0. With milk of average basic acidity the entire trisodium phosphate solution could be added in one step to produce a final pH of about 7.0.

Following the foregoing the concentrated milk mixture is spray dried.

In lieu of the 1.5 lbs. of trisodium phosphate in the above example, the hereinafter specified amounts of any one of the following compounds may be used without any further change in the above data or description of arriving at the modified dry skim milk product:

| | Lbs. |
|---|---|
| Disodium phosphate | 3.56 |
| Sodium carbonate | 0.79 |
| Sodium hydrogen carbonate | 3.56 |
| Sodium hydroxide | 0.356 |
| Potassium hydroxide | 0.356 |

The foregoing data are based on anhydrous salts and alkalis and reflect the degree of addition required to bring the skim milk selected for test purposes from an initial pH o f 6.4 to a final pH of 7.0.

Trisodium phosphate is the preferred skim milk modifier material.

Sodium dihydrogen phosphate may not be used as the modifier material, as it lacks the ability to raise the pH of the mixture over that of the initial skim milk and instead functions as a pH depressant for the skim milk.

Under certain circumstances it may be desirable to maintain the final pH of the mixture below 7.0 in order not to substantially change the pH value of the final meat mixture to which the alkali treated skim milk powder is added. It should also be pointed out that certain comminuted meat mixtures contain slightly acidic ingredients such as citric acid, ascorbic acid, or vinegar. Under such circumstances, it may be more desirable to add an alkali treated skim milk powder having a pH of 7.3 instead of 7.0. In short, the selection of the pH value of the alkali treated skim milk powder within the range of 6.8–7.3 will depend upon the specific type of meat product to which the powder is added.

EXAMPLE I

For the purposes of illustration, the comparative ability of regular dry skim milk and the alkali treated dry skim milk to prevent fat separation in a test formula is described as follows:

*Table I*

TEST SAUSAGE—FORMULA A

| | Grams |
|---|---|
| Lean pork leg meat | 1,240 |
| Lean beef chuck meat | 830 |
| Pork fat | 150 |
| | 2,220 |
| Dry skim milk (regular or special) | 100 |
| Salt | 46 |
| Corn sugar (dry) | 25 |
| Sodium nitrite | 0.35 |
| | 171.35 |
| Ice | 250    250 |
| Total weight | 2,641.35 |

PREPARATION AND TEST PROCEDURE

The meats and fat are passed through a grinder with ¼″ holes in the grinder plate. The ground meats are mixed in order that a homogeneous product results.

The meat mixture is placed in a Hobart food cutter, and the combined dry skim powder, corn sugar, salt, and sodium nitrite added during the first 30 seconds of operation. Water, in the form of ice, is added during the next 60 seconds and the food cutter operation continued for a total elapsed time of 5.0 minutes.

The raw sausage mixture is chilled to 35° F. Exactly 200.0 grams of the mixture is placed into 307 x 113 cans and the cans closed.

The canned raw sausage mixture is placed in a 175° F. water bath and cooked for 38 minutes to an internal temperature of 155±2° F. The cooked, canned sausage is chilled to 35° F. overnight.

The cans are opened and the meat mass removed. Free fat is removed from the exterior of the cooked meat mass and combined with any free fat adhering to the interior can surface. The cleaned meat mass, the combined free fat, and any serum remaining in the can are separately weighed.

The meat mass is broken open and the presence of fat pockets determined visually.

*Table II*

RESULTS OF EXAMINING TEST FORMULA A USING REGULAR AND SPECIAL DRY SKIM MILK

| | Weight of Meat Mass, gms. | Free Fat, gms. | Serum, gms. | Meat Interior |
|---|---|---|---|---|
| Regular Dry Milk solids | 166.6 | 4.87 | 28.57 | Numerous Fat Pockets. |
| Alkali Treated Dry Milk solids | 181.1 | 0 | 18.90 | No Fat Pockets. |

EXAMPLE II

With the object of determining the ability of the alkali treated dry skim milk to prevent free fat accumulation compared to regular skim milk powder, the total amount of meat (pork, beef and pork fat) were kept at a constant weight as in Formula A but the proportion of pork fat varied in subsequent Formulas B–J. All other constituents of the base Formula A were kept at the same ratios.

*Table III*

VISUAL EVALUATION OF COOKED PRODUCT

| Formula | Fat As Percent of Total Meat | With Regular Dry Skim Milk | | With Alkali Treated Dry Skim Milk | |
|---|---|---|---|---|---|
| | | Free Fat | Sausage Interior | Free Fat | Sausage Interior |
| B | 3 | 0 | Clear | | |
| C | 4 | 0 | do | 0 | Clear. |
| D | 5 | Small Amount Present. | Fat Pockets Present. | 0 | Do. |
| E | 6 | Large Amount Present. | Many Fat Pockets. | 0 | Do. |
| F | 7 | | | 0 | Do. |
| G | 8 | | | 0 | Do. |
| H | 9 | | | 0 | Do. |
| I | 10 | | | Small Amount Present. | Do. |
| J | 11 | | | Large Amount Present. | Fat Pockets Present. |

From the comparative observations noted in Table III, it is clear that when the formula is laden with excess fat, the alkali treated dry skim milk powder possesses a greater ability to prevent free fat appearance than does regular dry skim milk powder.

It was also noted from the results of the physical observation of the sausage formulations described in Table III that the sausage made using the alkali treated dry skim milk powder had a different appearance than when regular dry skim milk powder was used.

The sausage containing the alkali treated dry skim milk powder appeared to be dense, easily cut with a knife, and without a mushy or friable texture. When the sausage prepared with regular skim milk powder (containing the same amount of added fat) was compared to the sausage containing the alkali treated dry skim milk powder, the former appeared to be less dense, less firm when cut, with a more friable and mushy texture.

It is evident that the use of the alkali treated skim milk powder in place of regular skim milk powder as a sausage ingredient results in the advantageous changes noted below:

A. Prevents fat separation to the sausage surface
B. Minimizes fat pocket development in the body of the sausage
C. Produces a sausage having a dense appearance
D. Produces a less friable and musy sausage
E. Produces a sausage having a dryer appearance For the purpose of clarity, the term "sausage" as used in the specification and claims refers to either cased sausages or meat loaf products of various formulations depending upon common commercial designation. Further, the term "sausage" refers to specialty products such as ravioli, meat balls, or potted meats and similar comminuted meat mixtures which may be encased in pastry or packaged in cans with gravy and the like.

What is claimed is:

1. A method of making a sausage product comprising mixing together for 10–20 minutes at a temperature of 135–160° F. skim milk and an alkaline compound selected from the group of compounds consisting of the hydroxides of sodium and potassium, the salts of the alkali metals and phosphoric acid, and the carbonate and bicarbonate salts of the alkali metals, said compound being present in an amount sufficient to adjust the pH of the mixture to 6.8–7.3, concentrating and drying said mixture, and compounding an amount of said mixture with comminuted meat.

2. A method of making a sausage product comprising mixing together for 10–20 minutes at a temperature of 135–160° F. skim milk and an amount of trisodium phosphate sufficient to adjust the pH of the mixture to 6.8–7.3, concentrating and drying said mixture, and compounding an amount of said mixture with comminuted meat.

References Cited by the Examiner
UNITED STATES PATENTS

| | | | |
|---|---|---|---|
| 939,495 | 11/09 | Govers | 99—202 |
| 2,171,428 | 8/39 | Griffith et al. | 99—109 |
| 2,355,548 | 8/44 | Musher | 99—109 |
| 2,602,747 | 7/52 | Meade | 99—56 |
| 2,831,771 | 4/58 | McDonald et al. | 99—56 X |
| 3,050,400 | 8/62 | Poarch et al. | 99—109 |

A. LOUIS MONACELL, *Primary Examiner.*

ABRAHAM H. WINKLESTEIN, HYMAN LORD, *Examiners.*